United States Patent
Kuroiwa

(10) Patent No.: US 6,906,882 B2
(45) Date of Patent: Jun. 14, 2005

(54) RECORDING AND REPRODUCING APPARATUS AND METHOD

(75) Inventor: Toshio Kuroiwa, Yokohama (JP)

(73) Assignee: Victor Company of Japan, Ltd. (JP)

( * ) Notice: Subject to any disclaimer, the term of this patent is extended or adjusted under 35 U.S.C. 154(b) by 434 days.

(21) Appl. No.: 10/133,841

(22) Filed: Apr. 25, 2002

(65) Prior Publication Data

US 2002/0159185 A1 Oct. 31, 2002

(30) Foreign Application Priority Data

Apr. 27, 2001 (JP) .......... 2001-131796
Feb. 6, 2002 (JP) .......... 2002-029193

(51) Int. Cl.⁷ .................... G11B 15/18
(52) U.S. Cl. .................... 360/72.2
(58) Field of Search .......... 360/72.2, 69, 73.08, 360/71, 72.1; 386/46, 68, 69, 95

(56) References Cited

U.S. PATENT DOCUMENTS

| 4,890,168 A | * | 12/1989 | Inoue et al. ............ 386/69 |
| 5,406,381 A | * | 4/1995 | Han ...................... 386/95 |
| 5,587,789 A | * | 12/1996 | Lee et al. .............. 386/68 |
| 5,748,332 A | * | 5/1998 | Lee ...................... 386/68 |
| 6,011,894 A | * | 1/2000 | Nakamura et al. ........ 386/46 |
| 6,026,211 A | * | 2/2000 | Nakamura et al. ........ 386/46 |
| 6,101,061 A | * | 8/2000 | Goker .................. 360/73.08 |
| 6,304,716 B1 | * | 10/2001 | Hanai et al. ............ 386/95 |
| 6,327,417 B1 | * | 12/2001 | Hanai et al. ............ 386/46 |
| 6,417,978 B1 | * | 7/2002 | Enomoto ............... 360/72.2 |

FOREIGN PATENT DOCUMENTS

| JP | 07-123346 | 5/1995 | .......... H04N/5/76 |
| JP | 08-077760 | 3/1996 | .......... G11B/27/28 |
| JP | 10-188540 | 7/1998 | .......... G11B/27/28 |

* cited by examiner

Primary Examiner—David Hudspeth
Assistant Examiner—Fred F. Tzeng
(74) Attorney, Agent, or Firm—Renner, Kenner, Greive, Bobak, Taylor & Weber

(57) ABSTRACT

A signal is recorded on and reproduced from a first tape-like storage medium. At least one indexing signal is recorded on the first storage medium. Or, at least one indexing signal already recorded on the first storage medium is detected. The location of the indexing signal is determined as an indexing position. The signal that has been recorded on the first storage medium is recorded on a randomly accessible second storage medium from the indexing position for a specific period.

6 Claims, 4 Drawing Sheets

RECORDING AND REPRODUCING APPARATUS AND METHOD

BACKGROUND OF THE INVENTION

The present invention relates to recording and reproducing apparatus and method using tape-like storage media. Particularly, this invention relates to recording and reproducing apparatus and method with a high-speed accessibility for searching for indexing positions of recorded video or audio, for example.

Tape-like storage media have been used for recording video or audio signals because of large storage capacity but low recording costs compared to disk-like storage media and memories.

Nevertheless, it takes time for tape-like storage media wound around reels to access, for example, indexing positions of recorded video or audio, thus resulting in low accessibility. Increase in tape-feeding speed has little overcome this disadvantage for reproducing apparatus using tape-like storage media, but still not fulfilling high accessibility.

In addition to these apparatus, personal video recorders, or PVR, have been developed for recording digitally compressed video to and reproducing them from storage media such as, hard disk drive, or HDD, with a high-speed random accessibility, instead of tape-like storage media. PVR have a function of instantaneously reproducing any frame of recorded video. However, storage media for PVRs are mostly un-detachable and have a limit to storage capacity due to high costs for large storage capacity. PVR have therefore been used only for time-shift, etc.

Another type of recording equipment has also been proposed. It is a combination of a video tape recorder, or VTR, using tape-like storage media and PVR using HDD for high-speed accessibility. Such equipment with large capacity- and highly-accessible-storage media, such as, HDD, will however be expensive.

SUMMARY OF THE INVENTION

A purpose of the present invention is to provide recording and reproducing apparatus and method using a tape-like storage medium and a highly accessible storage medium, achieving high-speed accessibility in, for example, searching for indexing positions of recorded video or audio and low recording costs.

The present invention provides a recording and reproducing apparatus including: a first recorder and reproducer to drive a tape-like first storage medium for recording a signal on and reproducing the signal from the first storage medium, record at least one first indexing signal on the first storage medium or detect at least one second indexing signal already recorded on the first storage medium, and determine the location of the recorded first or second indexing signal as an indexing position; a second recorder and reproducer to record a signal on and reproduce the signal from a randomly accessible second storage medium; and a controller to control the second recorder and reproducer to record the signal that has been recorded on the first storage medium on the second storage medium from the indexing position for a specific period P.

Moreover, the present invention provides a recording and reproducing method including the steps of: recording a signal and at least one indexing signal on a tape-like first storage medium; determining the location of the indexing signal as an indexing position; and recording the signal that has been recorded on the first storage medium on a randomly accessible second storage medium from the indexing position for a specific period P.

Furthermore, the present invention provides a recording and reproducing method including the steps of: detecting at least one indexing signal already recorded on a tape-like first storage medium; determining the location of the indexing signal as an indexing position; and recording a signal that has been recorded on the first storage medium on a randomly accessible second storage medium from the indexing position for a specific period P.

DETAILED DESCRIPTION OF PREFERRED EMBODIMENTS

Preferred embodiments according to the present invention will be disclosed with reference to the attached drawings.

Figure 1:
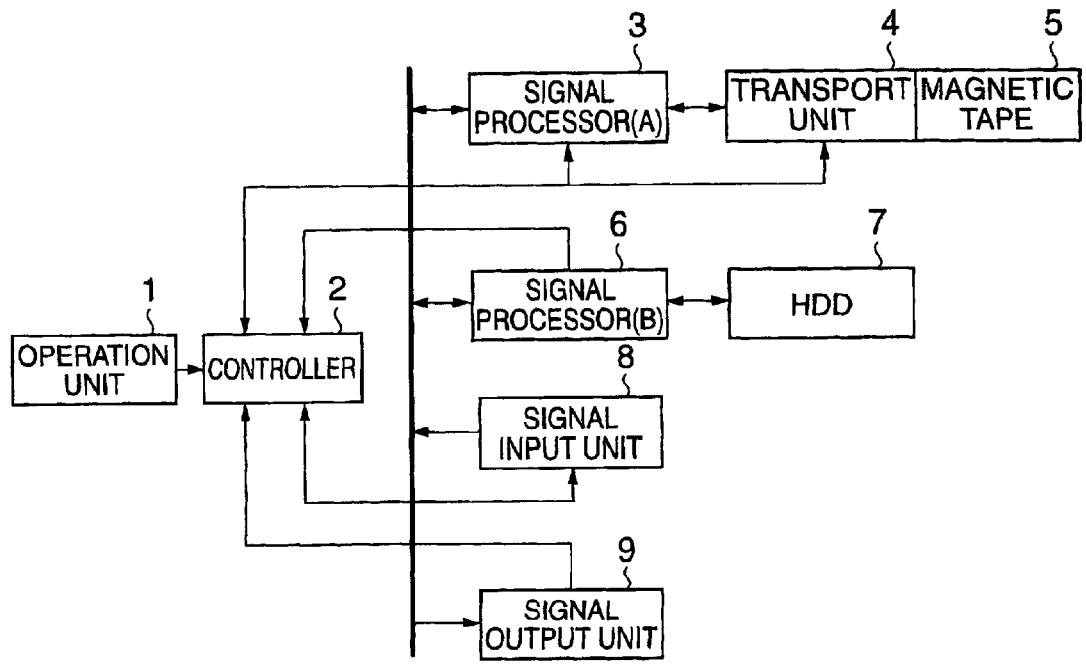
FIG. 1 shows a block diagram of a recording and reproducing apparatus according to the present invention.

FIG. 1 shows a block diagram of a recording and reproducing apparatus according to the present invention.

The apparatus is equipped with a signal input unit 8 for receiving external video and audio signals; a signal output unit 9 for outputting video and audio signals; signal processors (A)3 and (B)6 for processing the received signals so that they can be recorded on and reproduced from a magnetic tape 5 and a HDD 7, respectively; a transport unit 4 for driving the magnetic tape 5 and recording the signals on and reproducing them from the magnetic tape 5; a controller 2 for controlling the entire operation of the apparatus via a signal bus BU; and an operation section 1 for user operation.

The transport unit 4 has the following functions:

Form main track areas sequentially on the magnetic tape 5, the main track areas being to be used for recording video and audio signals;

Form control track areas linearly on a part of track areas or in a longitudinal direction on the magnetic tape 5, the control track areas being to be used for recording various control signals;

Record an indexing signal on each specific position on the magnetic tape 5, the indexing signal being to be used for searching for an indexing position of each recorded video or audio, each position at which the indexing signal being recorded is the position at which the video and audio signals recorded on the main tracks will change for their contents, such as at the head of each chapter; and Record track numbers sequentially on control track areas of the magnetic tape 5, that indicate the number of tracks for each main track from the tape head or tape end.

Detection of the current tape location and its reproducing time from the tape head or tape end is possible based on the track numbers. This function is available because track-recording density will be constant over the magnetic tape 5 and also a tape travel speed in recording/reproduction will be constant.

In addition to the functions disclosed above, the transport unit 4 has functions of measuring the entire length of the magnetic tape 5 and detecting, not so precise but, the current location of the magnetic tape from the tape head or tape end. These functions are performed with detection of a tape-feeding amount and a reel-rotating angle while the magnetic tape 5 is travelling a little bit.

Figure 2A:
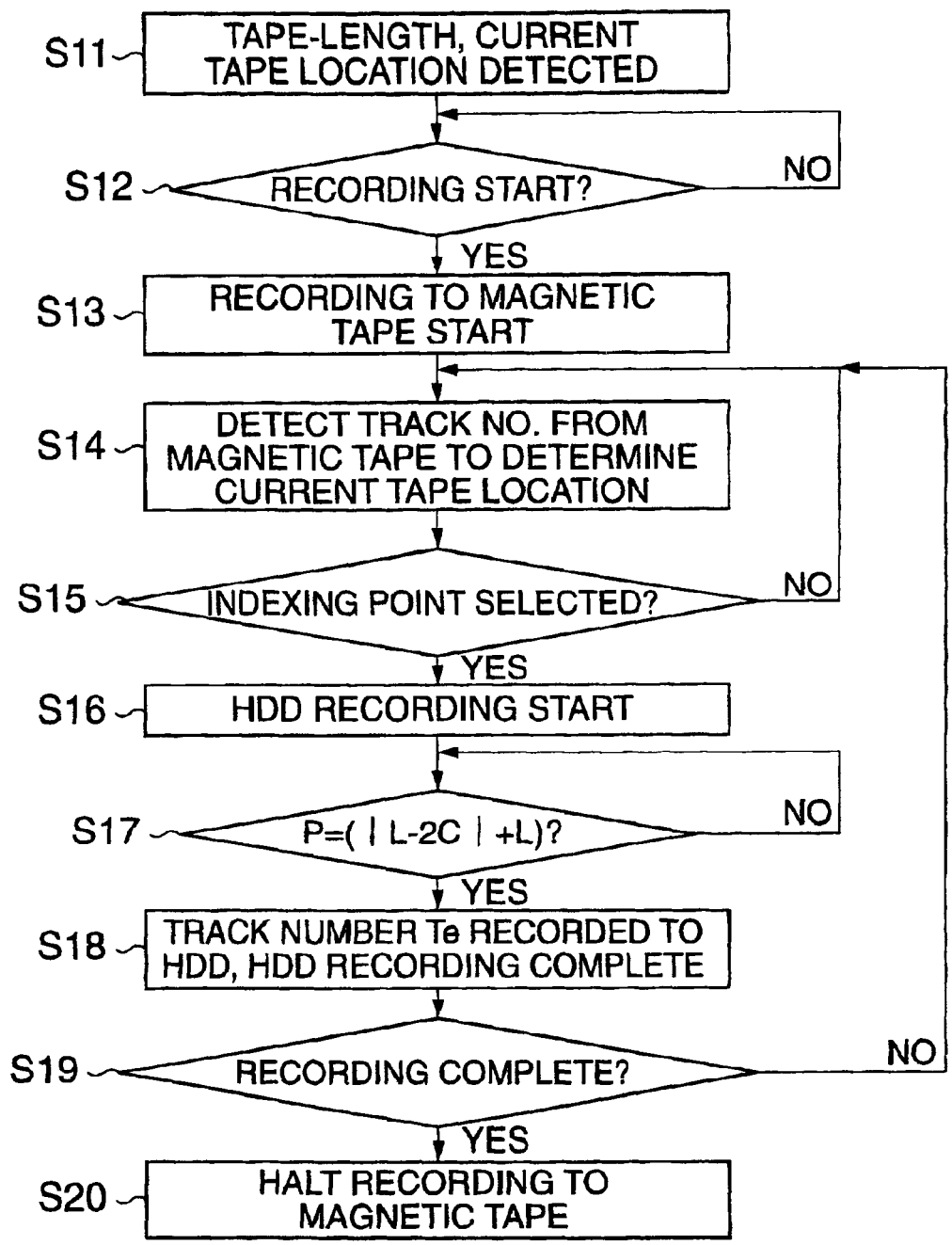
FIG. 2A shows a flowchart indicating a recording operation of the recording and reproducing apparatus shown in FIG. 1.

Disclosed next with reference to FIG. 2A is an operation of the recording and reproducing apparatus shown in FIG. 1, for recording signals on the magnetic tape 5.

When the magnetic tape 5 is loaded into the transport unit 4, the controller 2 controls the transport unit 4 to measure a length L of the magnetic tape 5 and detect its current location from the tape head or tape end, although not accurate, while the magnetic tape 5 is travelling a little bit, the length L and the position being transmitted to the controller 2 (step S11).

The controller 2 waits for a recording start command from the operation unit 1 (step S12). In response to the command, the controller 2 transmits video and audio signals from the signal input unit 8 to the signal processors (A)3 and (B)6, and the transport unit 4 drives the magnetic tape 5 to travel and starts recording video and audio signals thereon (step S13). The transport unit 4 detects the track numbers on the travelling magnetic tape 5 and transmits the detected track numbers to the controller 2. The controller 2 repeats calculation of the current tape location C from the tape head or tape end based on the track numbers (step S14).

A user operates the operation unit 1 so that indexing signals can be recorded on the magnetic tape 5 at user-selected indexing positions while the video and audio signals are being recorded (step S15). This user operation is performed while the user is watching the video and audio to be recorded on a monitor screen (not shown).

The controller 2 controls the signal input unit 8 to send the video and audio signals to the signal processor (B)6 to start recording the signals on the HDD 7. It also controls the transport unit 4 to record the indexing signals on the magnetic tape 5 at the user-selected indexing positions (step S16).

Figure 3:
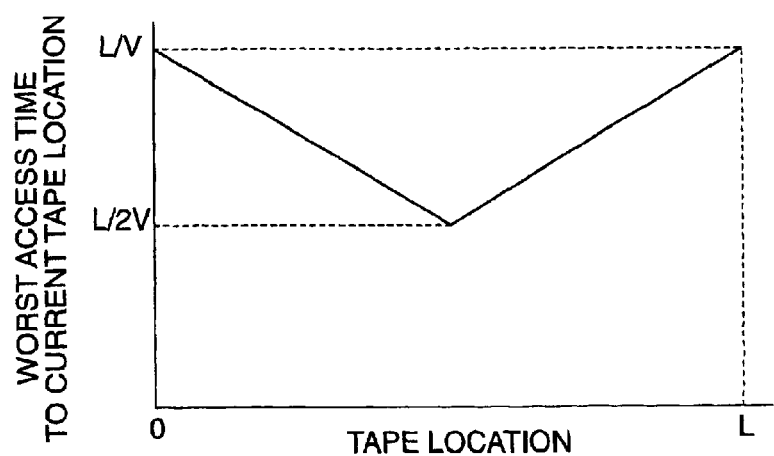
FIG. 3 is a graph showing a relation between the current tape location from the tape head or tape end and the worst access time to the current tape location.

The recording to the HDD 7 is performed for a period P calculated by the controller 2, which is calculated as P=(|L−2C|+L)/2V in which L is the length of the magnetic tape 5 and V is a fast forward/backward tape speed set at the transport unit 4 (step S17). The period P indicates the worst access time for the fast tape forward/backward feeding to the current tape location C from the tape head or tape end. The period P will vary as the current tape location C varies, as shown in FIG. 3. Together with the video and audio signals, a track number Te on the magnetic tape 5, at which the recording has been completed, are recorded on the HDD 7 (step S18).

The operations from step S14 to S18 will be repeated for each user operation during the recording (step S19). The recording to the magnetic tape 5 is brought in a halt by user operation (step S20).

Through these operations, the video and audio signals are recorded on the HDD 7 from the user-selected indexing positions by the number of times corresponding to the number of locations of the recorded indexing signals.

The operations I disclosed above with reference to FIG. 2A is the recording of video and audio signals, and also of indexing signals at user-selected positions on the magnetic tape 5.

The recording to the HDD 7 in steps S16 to S18 in FIG. 2A will also be performed when the magnetic tape 5 on which indexing signals have already been recorded is subjected to reproduction while no signals have been recorded on the HDD 7 from the user-selected positions (operations II).

Figure 2B:
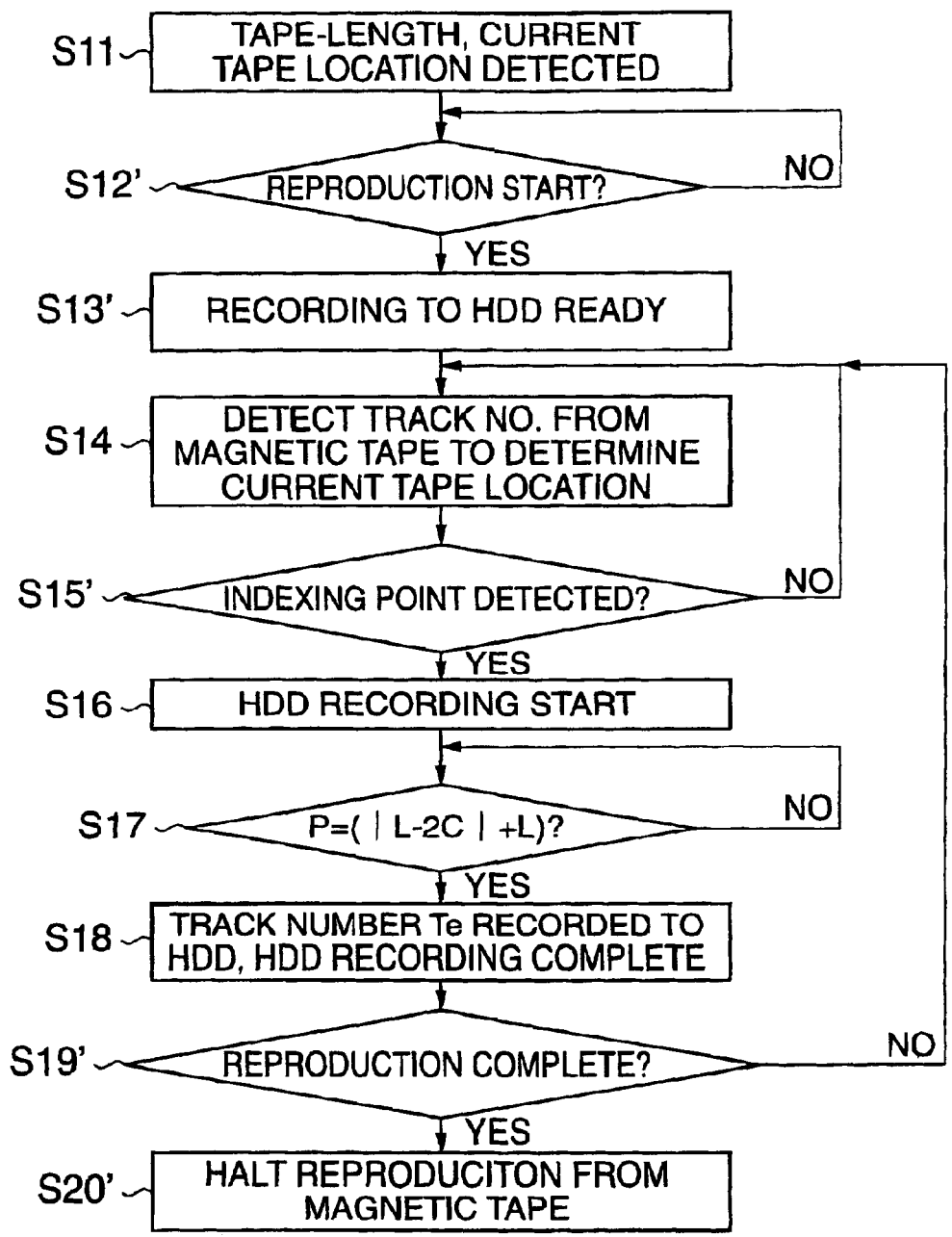
FIG. 2B shows a flowchart indicating another recording operation of the recording and reproducing apparatus shown in FIG. 1.

The operations I and II are different in steps S12, S13, S15, S19 and S20 in FIG. 2A. Hence, the operations II will be disclosed only for these steps with reference to FIG. 2B.

The controller 2 determines the start of reproduction from the magnetic tape 5 in response to user operation via the operation unit 1 (step S12').

The reproduction from the magnetic tape 5 starts after the controller 2 has controlled the signal processor (A)3 to send the video and audio signals to the signal processor (B)6 (step S13'). This is different from step S13 (operations I) in which the video and audio signals are sent to the signal processor (B)6 from the signal input unit 8.

After the step S14 (the same as in the operations I), the transport unit 4 detects an indexing signal recorded at the current tape location C from the tape head or tape end (step S15'). This is different from step S15 (operations I) in which indexing signals will be recorded through user operation.

After the steps S16 to S18 (the same as in the operations I), the controller 2 determines whether the reproduction from the magnetic tape 5 is completed, or the operations from step S14 to S18 will be repeated for further reproduction (step S19').

The reproduction from the magnetic tape 5 is brought in a halt when the controller 2 detects the completion of reproduction (step S20').

Figure 4:
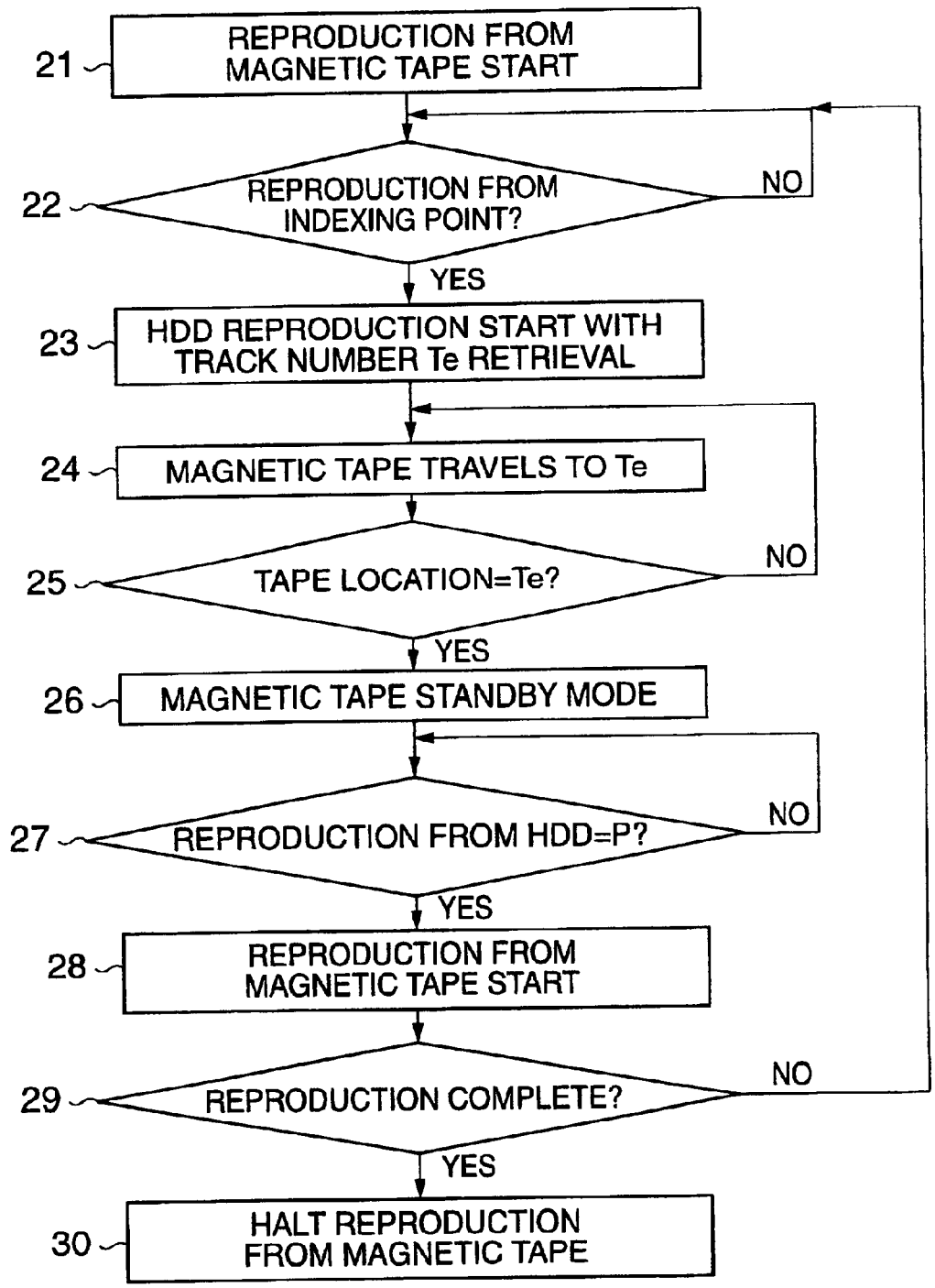
FIG. 4 shows a flowchart indicating a reproducing operation of the recording and reproducing apparatus shown in FIG. 1.

Disclosed next with reference FIG. 4 is reproduction of the video and audio signals from the indexing positions after these signals have been recorded on the HDD 7 through the operations I or II.

The magnetic tape 5 is loaded into the transport unit 4. The controller 2 controls the signal processor (A)3 and the signal output unit 9 to reproduce the video and audio signals (step S21).

The user selects one of the indexing positions set on the magnetic tape 5 to reproduce the video and audio signals from the indexing position on the HDD 7 via the operation unit 1 (step S22).

In response to the user selection, the controller 2 controls the signal processor (B)6 to start reproduction of the video and audio signals from the selected indexing position on the HDD 7, the output of the signal processor (B)6 being sent to the signal output unit 9 (step S23). User-desired video and audio signals thus can be reproduced with almost no delays from the user operation. Simultaneously with the reproduction from the HDD 7, the controller 2 retrieves one of the track numbers Te from the HDD 7.

The controller 2 controls the transport unit 4 to drive the magnetic tape 5 to travel to the indexing position at the track number Te (step S24).

The transport unit 4 detects a track number on the magnetic tape and compares it with the retrieved track number Te to determine whether to perform feed forward or backward (step S25). This operation is performed because the current tape location C from the tape head or tape end varies in accordance with user operations. The magnetic tape 5 is then brought into a standby mode (step S26).

The reproduction from the HDD 7 has continued. It is determined whether the period P explained in the operations I has passed (step S27). If the period P has passed, the controller 2 informs the transport unit 4 of the transition from the standby mode to a reproduction mode and releases the signal processor B6 from the signal bus BU whereas connects the signal processor (A)3 to the signal bus to start reproduction from the magnetic tape 5 (step S28). This operation achieves a smooth switching of reproduction from the HDD 7 to the magnetic tape 5.

When a user reproduction-halt instruction is detected (step S29), the reproduction from the magnetic tape 5 is brought in a halt (step S30).

As disclosed above, once video and audio signals have been recorded on the magnetic tape with indexing signals or after reproduction from the magnetic tape on which indexing signals have been recorded, the video and audio signals and also the indexing signals are recorded on the HDD. The video and audio signals thus can be spontaneously reproduced from the HDD from any indexing position.

This mechanism achieves decrease in apparent waiting time for reproduction from the magnetic tape. In other words, the user feels as if the waiting time for reproduction from a selected indexing position on the magnetic tape is shortened.

Moreover, since the capacity of the HDD, the highly accessible storage medium, is the minimum for use with no increase necessary, the waiting time for reproduction from a selected indexing position can be shortened regardless of the current tape location from the tape head or tape end in this invention.

What is claimed is:

1. A recording and reproducing apparatus comprising:

a first recorder and reproducer to drive tape-like first storage medium for recording a signal on and reproducing the signal from the first storage medium, record at least one first indexing signal on the first storage medium or detect at least one second indexing signal already recorded on the first storage medium, and determine the location of the recorded first or second indexing signal as an indexing position;

a second recorder and reproducer to record a signal on and reproduce the signal from a randomly accessible second storage medium; and a controller to control the second recorder and reproducer to record the signal that has been recorded on the first storage medium on the second storage medium from the indexing position for a specific period P, period P equaling $(|L-2C|+L)/2V$ in which L is a length of the first storage medium, V is a fast forward/backward feeding speed for the first storage medium and C is the current location of the first storage medium from the head or the end of the tape-like first storage medium.

2. The recording and reproducing apparatus according to claim 1, wherein the controller controls the second recorder and reproducer to reproduce the signal from the second storage medium from the indexing position until the first storage medium driven by the first recorder and reproducer reaches at least the indexing position by fast forward/backward feeding for reproduction of the signal from the indexing position on the first storage medium.

3. A recording and reproducing method comprising the steps of:

recording a signal and at least one indexing signal on a tape-like first storage medium;

determining the location of the indexing signal as an indexing position; and recording the signal that has been recorded on the first storage medium on a randomly accessible second storage medium from the indexing position for a specific period P, period P equaling $(|L-2C|+L)/2V$ in which L is a length of the first storage medium, V is a fast forward/backward feeding speed for the first storage medium and C is the current location of the first storaae medium from the head or the end of the tape-like first storage medium.

4. The recording and reproducing method according to claim 3 further comprising the step of reproducing the signal from the indexing position on the second storage medium until the first storage medium reaches at least the indexing position by fast forward/backward feeding for reproduction of the signal from the indexing position on the first storage medium.

5. A recording and reproducing method comprising the steps of:

detecting at least one indexing signal already recorded on a tape-like first storage medium;

determining the location of the indexing signal as an indexing position; and recording a signal that has been recorded on the first storage medium on a randomly accessible second storage medium from the indexing position for a specific period P, period P equaling $(|L-2C|+L)/2V$ in which L is a length of the first storage medium, V is a fast forward/backward feeding speed for the first storage medium and C is the current location of the first storage medium from the head or the end of the tape-like first storage medium.

6. The recording and reproducing method according to claim 5 further comprising the step of reproducing the signal from the indexing position on the second storage medium until the first storage medium reaches at least the indexing position by fast forward/backward feeding for reproduction of the signal from the indexing position on the first storage medium.

* * * * *